J. REARDON.
PROCESS OF MAKING HARD RUBBER ARTICLES, SUCH AS COMBS AND THE LIKE.
APPLICATION FILED JULY 22, 1920.

1,359,919.

Patented Nov. 23, 1920.

INVENTOR
James Reardon
BY
ATTORNEY

J. REARDON.
PROCESS OF MAKING HARD RUBBER ARTICLES, SUCH AS COMBS AND THE LIKE.
APPLICATION FILED JULY 22, 1920.

1,359,919.

Patented Nov. 23, 1920.
2 SHEETS—SHEET 2.

INVENTOR
James Reardon
BY
Leo J. Matty.
ATTORNEY

UNITED STATES PATENT OFFICE.

JAMES REARDON, OF BLOOMINGDALE, NEW JERSEY, ASSIGNOR TO AMERICAN HARD RUBBER CO., OF NEW YORK, N. Y., A CORPORATION OF NEW YORK.

PROCESS OF MAKING HARD-RUBBER ARTICLES, SUCH AS COMBS AND THE LIKE.

1,359,919.

Specification of Letters Patent.    Patented Nov. 23, 1920.

Application filed July 22, 1920. Serial No. 398,258.

*To all whom it may concern:*

Be it known that I, JAMES REARDON, a citizen of the United States, residing at Bloomingdale, in the county of Passaic and State of New Jersey, have invented new and useful Improvements in Processes of Making Hard-Rubber Articles, such as Combs and the like, of which the following is a full, clear, and exact description, such as will enable others skilled in the art to which it appertains to use the same.

This invention relates to the process of making hard rubber articles, such as combs and the like, and the objects of the invention are to render the process more expeditious and considerably cheaper. To the accomplishment of the above objects and to such others as may hereinafter appear the invention comprises a process of using rubber compound, made in the shape of a rod of round or oval cross section and of suitable length, which is placed between two flat sheets of tin and then inserted between a suitable die, cut to form some hard rubber article, such as a comb, the initial movement of the die together forces the two flat sheets of tin against the round or oval rubber compound on the highest and lowest tangent points of the rubber compound throughout its entire length, on the further movement of the die together the tin and rubber compound progressively fill every part of the die cavities, expelling the air progressively from between the rubber compound and the sheets of tin, as the die advances. When the die is finally forced together all of the air from between the rubber compound and the tin sheets will have been expelled, the rubber compound with its coating of tin filling the die perfectly without blisters of any kind, as the air has been progressively expelled from between the tin and the compound as the die is forced together.

By the old universally known process it was necessary to run the rubber compound through calenders to bring the rubber compound to a given gage or thickness corresponding to the greatest thickness of the article to be made. It was then necessary to cover both sides of said rubber compound with sheets of tin, pressed into intimate contact with the rubber compound by means of a heavy roller to expell the air. Rubber compound thus plated was cut into rectangular blocks of approximately the same surface area as the die between which they were to be pressed.

In the old method just described it was necessary that the volume of rubber compound be largely in excess of what was actually required to fill the die cavities, as the rubber compound was confined between two relatively stiff sheets of tin and would not even under the greatest pressure fill out any part of the die cavities deeper than itself in thickness.

By the old method when the sheets of tin were rolled down tightly on both sides of the calendered rubber compound, the same lost practically all of its freedom of movement, and in order to assume the outlines of the die, it was necessary for the tin sheets to stretch mostly along their surfaces, which frequently resulted in the tin sheets being ruptured due to surface stretch, necessitating the use of comparatively heavy sheets of tin to allow for this surface stretch, and even these frequently ruptured, allowing water to enter during vulcanization, which ruined the hard rubber article.

The calendering and plating of the rubber compound under the old method to expel the air, frequently allowed air to enter under the plates when the same was cut into small blocks to fit the die, as the cutting knife frequently turned the edges of the plates, permitting air to enter, which eventually caused blisters and surface defects.

In accordance with the present invention the rubber compound instead of being calendered is run through a so-called rod machine or strainer, which acts by means of a worm screw to force the rubber compound out through an orifice which in the present instance is preferably round or oval. The round or oval compound thus formed is cut in suitable lengths to a little more than enough to entirely fill the die cavities. Frequent tests have shown that the excess compound required by this method is very little as compared with the excess amount required by the old method.

Referring to the drawings.

Figure 1:
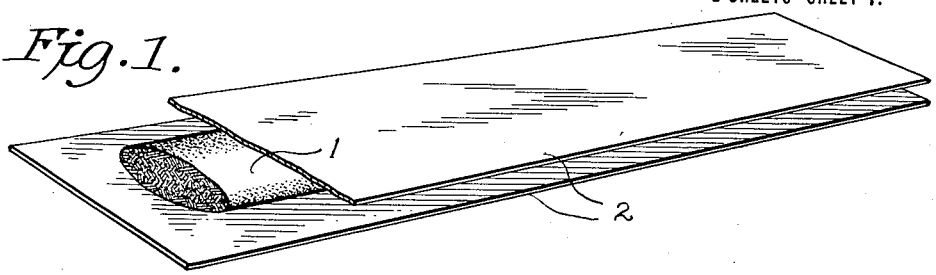
Figure 1 is a perspective view partly in section showing a piece of rubber compound between two sheets of tin or similar metal, in accordance with the present invention.

In the drawings 1 designates a piece of rubber compound, or rubber compound blank whose cross sectional area is preferably either round or oval the same in the present instance being shown as oval. The rubber compound blank 1 is preferably made in a so-called rod machine or strainer having a circular or oval orifice out of which the compound is forced and cut into suitable lengths to form blanks.

Figure 2:
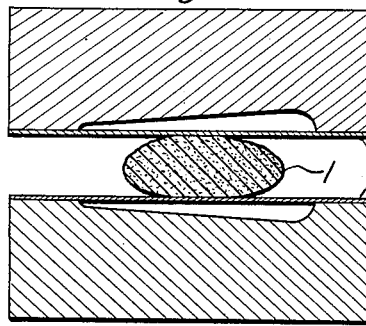
Fig. 2 is a transverse sectional view of the rubber compound and metal sheets shown in Fig. 1 placed between two dies.
Figure 3:
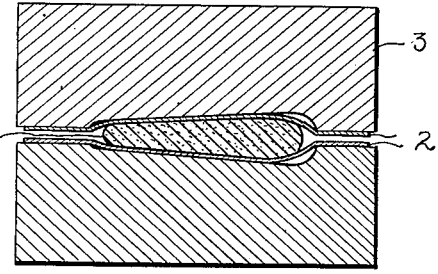
Fig. 3 is a view similar to Fig. 2 showing the dies after they have been partially forced together.

The rubber compound blank 1 is laid between two flat pieces of tin or similar metal sheets 2 as shown in Fig. 1, the same being then placed between upper and lower dies 3 as shown in Fig. 2. When pressure is applied to force the die 3 together the rubber compound blank 1 and the tin sheets 2 assume the position shown in Fig. 3, the continuation of the pressure forcing the die together to assume the closed position shown in Fig. 4.

From the above description it will be seen that the rubber compound blank 1 when shaped as above described and placed between two flat sheets of tin will act when placed between the die to progressively fill every part of the die cavities, expelling the air progressively from between the rubber compound and the sheets of tin as the die advances and until it closes.

Figure 4:
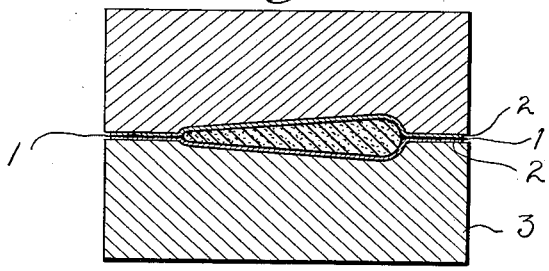
Fig. 4 is a view similar to Figs. 2 and 3 showing the dies after they have been completely forced together.
Figure 5:
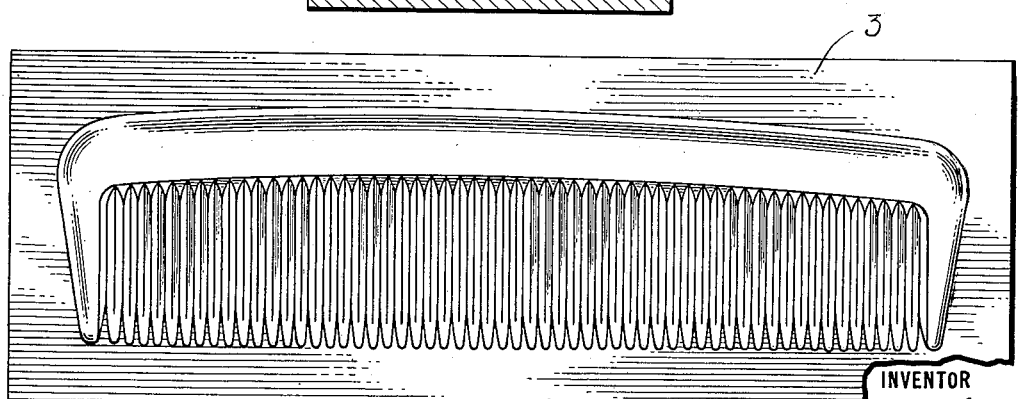
Fig. 5 is a top view of one of the dies shown in Figs. 2, 3 and 4.

The exact volume of the rubber compound blank can easily be controlled by varying the cross sectional area and the length of the blank so that the same will but little more than fill the die cavities and leave but little scrap just sufficient to seal the outer edges of the tin sheets as shown in Fig. 4.

In the use of the present process it is possible to use tin or metal sheets of very light gage without breaking its surface in the sharpest crevices of a die.

Figure 6:
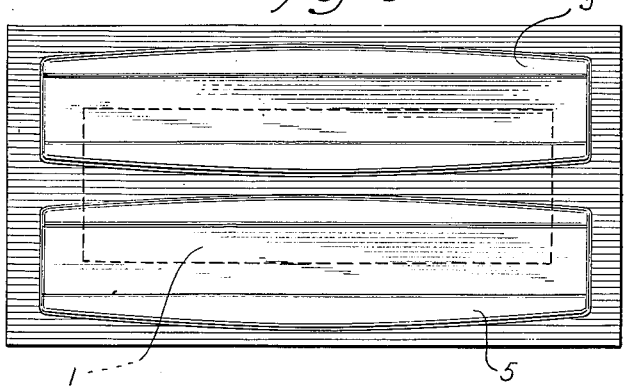
Fig. 6 is a plan view showing two comb blanks pressed between two sheets of tin after they have been removed from the die, the compound rubber blank used being shown in dotted lines.
Figure 7:
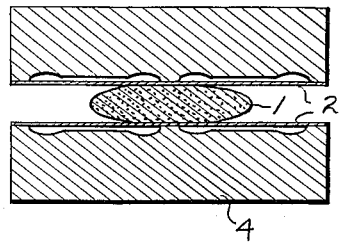
Fig. 7 is a transverse sectional view of the die, sheets of tin and rubber compound before the die is closed to produce the article shown in Fig. 6.

In accordance with the present instance it is also possible to use a die 4 for forming two combs 5 from one piece of rubber compound as shown in Figs. 6 and 7.

Figure 8:
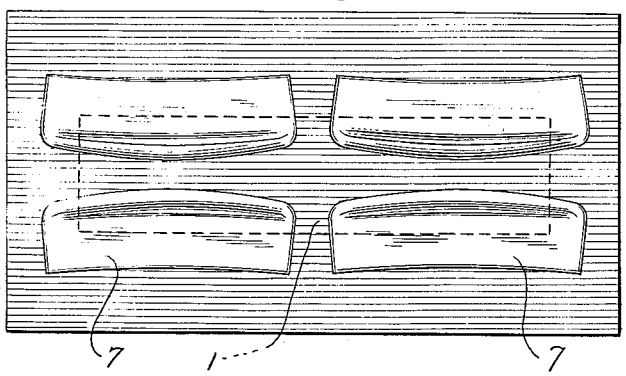
Fig. 8 is a plan view showing four comb blanks pressed between two sheets of tin after they have been removed from the die, the compound rubber blank used being shown in dotted lines.
Figure 9:
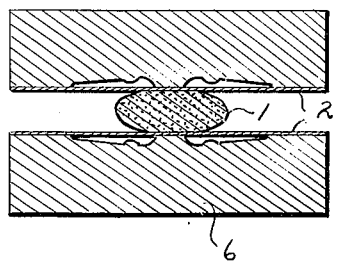
Fig. 9 is a transverse sectional view of the die, sheets of tin, and rubber compound before the die is closed to produce the article shown in Fig. 8.

In Figs. 8 and 9 is shown a die 6 for forming four combs 7 from one piece of rubber compound.

Figure 10:
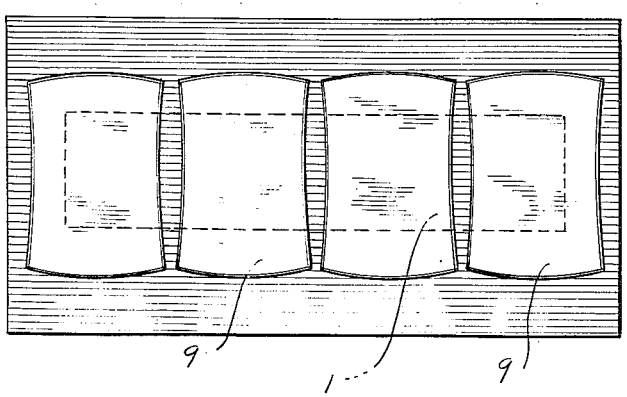
Fig. 10 is a plan view showing four comb blanks pressed transversely between two sheets of tin after they have been removed from the die, the compound rubber blank used being shown in dotted lines.
Figure 11:
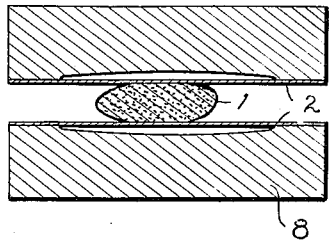
Fig. 11 is a transverse sectional view of the die, sheets of tin and rubber compound before the die is closed to produce the article shown in Fig. 10.

In Figures 10 and 11 is shown a die 8 for forming four combs 9 from one piece of rubber compound, the comb forming die cavities being cut transversely to that shown in Figs. 8 and 9.

From the above description it will be seen that the initial movement of the die in each instance forces the two flat pieces of tin against the round or oval compound on the highest and lowest tangent points of the compound throughout its entire length, the further movement of the die together forces the tin and compound to progressively fill every part of the die cavities, expelling the air progressively from between the compound and the sheets of tin, as the die closes.

While the invention has been described with particular reference to details the same is not to be considered as limited thereto as many changes can be made and still fall within the scope of the invention set forth in the following claims.

What I claim is:

1. The process of making hard rubber articles such as combs which comprises forming a rubber compound blank whose cross sectional area is round or oval placing said blank between two sheets of metal and placing the same between a die and forcing the die together.

2. The process of making hard rubber articles such as combs which comprises forming a rubber compound blank to progressively engage the cavities of a die as the same is forced together, placing said blank between two sheets of metal and placing the same between a die and forcing the die together.

3. The process of making hard rubber articles such as combs which comprises forming a rubber compound blank to progressively engage the cavities of a die to progressively expel the air as the die is forced together, placing said blank between two sheets of metal and placing the same between a die and forcing the die together.

4. The process of making hard rubber articles such as combs which comprises forming a rubber compound blank to progressively engage the cavities of a die to progressively expel the air as the die is forced together, placing said blank between two sheets of metal and placing the same between a die and forcing the die together, to thereby progressively expel the air from between the blank and the sheets of metal as the die is forced together.

In testimony whereof I have signed this specification in the presence of two subscribing witnessses.

JAMES REARDON.

Witnesses:
  GEORGE J. FRITZ,
  ROY F. ANGUS.